United States Patent [19]
Singh et al.

[11] Patent Number: 5,686,196
[45] Date of Patent: Nov. 11, 1997

[54] SYSTEM FOR OPERATING SOLID OXIDE FUEL CELL GENERATOR ON DIESEL FUEL

[75] Inventors: Prabhu Singh, Export; Raymond A. George, Pittsburgh, both of Pa.

[73] Assignee: Westinghouse Electric Corporation, Pittsburgh, Pa.

[21] Appl. No.: 727,986

[22] Filed: Oct. 9, 1996

[51] Int. Cl.⁶ ..................................................... H01M 8/06
[52] U.S. Cl. .................. 429/17; 429/19; 429/30
[58] Field of Search ..................... 429/17, 19, 13, 429/12, 30, 34, 20, 21; 208/208–214

[56] References Cited

U.S. PATENT DOCUMENTS

| | | | |
|---|---|---|---|
| 3,449,168 | 6/1969 | Sederquist et al. | 429/17 |
| 4,395,468 | 7/1983 | Isenberg | 429/31 |
| 4,702,971 | 10/1987 | Isenberg | 429/31 |
| 5,143,800 | 9/1992 | George et al. | 429/20 |
| 5,284,717 | 2/1994 | Yamase et al. | 429/17 |
| 5,413,879 | 5/1995 | Domeracki et al. | 429/30 |

*Primary Examiner*—Anthony Skapars

[57] ABSTRACT

A system is provided for operating a solid oxide fuel cell generator on diesel fuel. The system includes a hydrodesulfurizer which reduces the sulfur content of commercial and military grade diesel fuel to an acceptable level. Hydrogen which has been previously separated from the process stream is mixed with diesel fuel at low pressure. The diesel/hydrogen mixture is then pressurized and introduced into the hydrodesulfurizer. The hydrodesulfurizer comprises a metal oxide such as ZnO which reacts with hydrogen sulfide in the presence of a metal catalyst to form a metal sulfide and water. After desulfurization, the diesel fuel is reformed and delivered to a hydrogen separator which removes most of the hydrogen from the reformed fuel prior to introduction into a solid oxide fuel cell generator. The separated hydrogen is then selectively delivered to the diesel/hydrogen mixer or to a hydrogen storage unit. The hydrogen storage unit preferably comprises a metal hydride which stores hydrogen in solid form at low pressure. Hydrogen may be discharged from the metal hydride to the diesel/hydrogen mixture at low pressure upon demand, particularly during start-up and shut-down of the system.

21 Claims, 1 Drawing Sheet

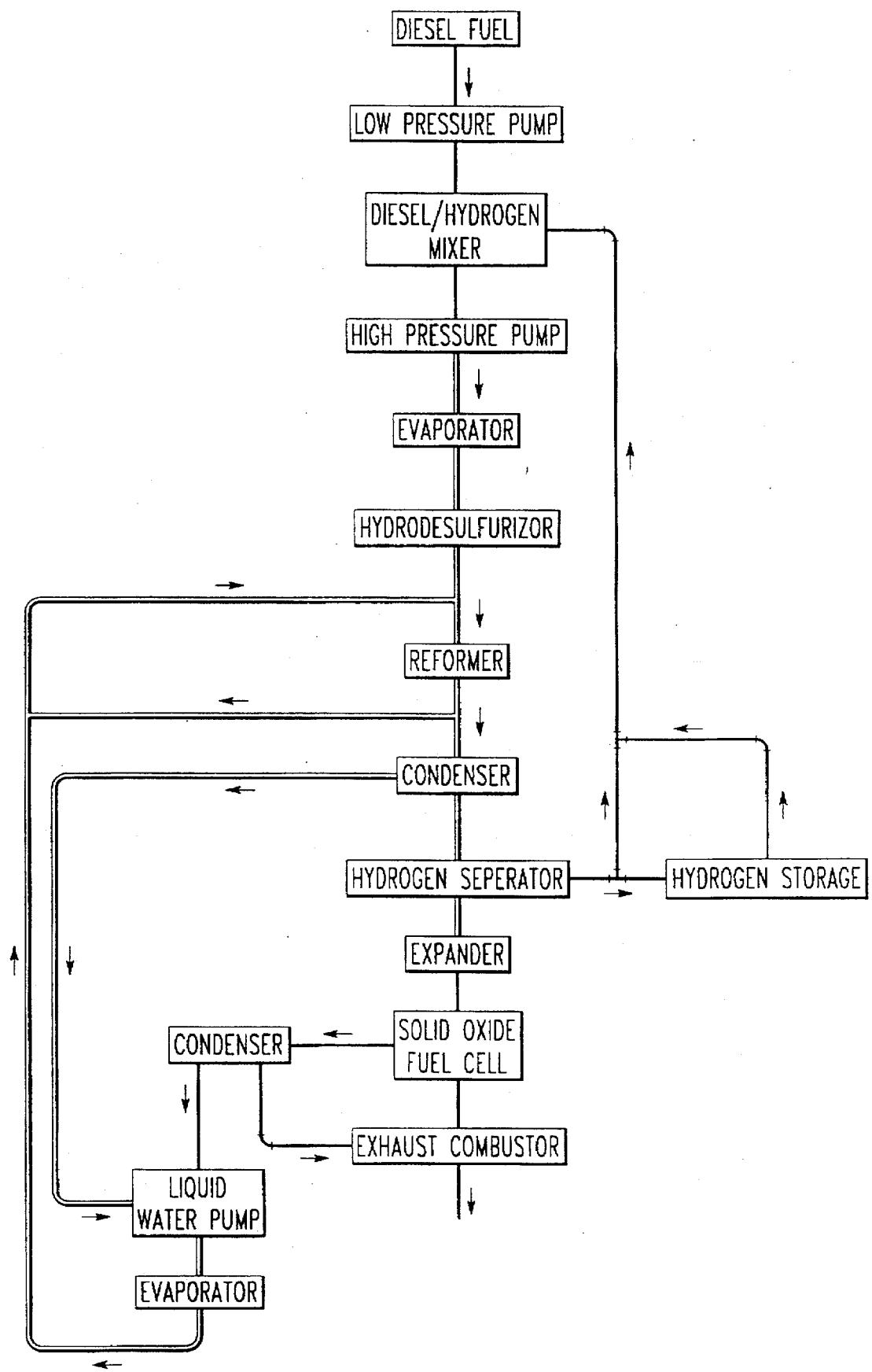

SYSTEM FOR OPERATING SOLID OXIDE FUEL CELL GENERATOR ON DIESEL FUEL

STATEMENT OF GOVERNMENT INTEREST

The invention described herein was made in performance of work under NASA Contract No. NAS 3-27022 and is subject to the provisions of Section 305 of the National Aeronautics and Space Act of 1958 (42 U.S.C. 2457).

BACKGROUND OF THE INVENTION

1. Field of the Invention

The present invention relates to solid oxide fuel cells, and more particularly to a system for operating a solid oxide fuel cell generator on desulfurized liquid diesel fuel.

2. Background Information

High temperature solid oxide fuel cell (SOFC) power generation systems are currently being developed for dispersed and centralized power generation applications. Solid oxide fuel cells offer high efficiency, reduced stack pollution (particulates, SOx, NOx, etc.) and flexibility of operation on coal derived and natural gas fuels. Several multi-cell, multi-kilowatt SOFC generators have been successfully operated for several thousand hours. Exemplary SOFC systems are disclosed in U.S. Patent Nos. 4,395,468, 4,702,971, 5,143,800 and 5,413,879, which are incorporated herein by reference.

Recently, interest has developed in operating SOFC generators on military strategic fuel (liquid diesel fuel) for land based applications. For such applications, fuel cell power plants offer significant advantages in terms of reduced fuel consumption (kg/kWE), lower noise, and much lower emissions. These advantages make the system suitable for military use.

Due to the significant sulfur content of diesel fuels, their use as a fuel source for conventional solid oxide fuel cell generators has been limited. Attempts have been made to desulfurize diesel fuel in hydro-desulfurizer prior to introduction into solid oxide fuel cell generators by adding pressurized hydrogen to the diesel fuel. For example, prior art fuel cell systems designed for military use require a source of high pressure hydrogen gas for desulfurizing the fuel in a hydrodesulfurizer (HDS) prior to its entry into the catalytic reformer, where higher hydrocarbons are reformed to methane, hydrogen, carbon monoxide, etc. (fuel constituents for SOFC). The hydrogen requirement for sulfur removal is primarily dictated by the amount of sulfur present in the liquid diesel fuel and can be met either by storing high pressure hydrogen on site or by generating high pressure hydrogen during the processing of the diesel fuel. On site high pressure hydrogen storage does not appear very attractive from the safety and space requirement point of view. Generating high pressure hydrogen during the processing of liquid diesel using pressure swing absorption (PSA) techniques or other techniques requires large equipment and complicated process controls. Furthermore, generating high pressure hydrogen during the operation does not solve the hydrogen requirements during start-up and shut down of the generator.

SUMMARY OF THE INVENTION

A system is provided for operating a solid oxide fuel cell generator on diesel fuel. Commercial or military grade diesel fuel comprising significant amounts of sulfur is mixed with hydrogen at low pressure to form a diesel/hydrogen mixture. The diesel/hydrogen mixture is pressurized and then introduced into the hydrodesulfurizer to substantially reduce the sulfur content of the diesel fuel. After desulfurization, the diesel fuel is reformed in a reformer and delivered to a hydrogen separator which removes a part of the hydrogen from the reformed fuel stream prior to its introduction into a solid oxide fuel cell generator. The separated hydrogen is then selectively delivered to the diesel/hydrogen mixer or to a metal-hydride type hydrogen storage unit. The hydrogen storage unit preferably comprises a metal hydride which stores hydrogen in solid form at low pressure. Hydrogen may be discharged from the metal hydride to the diesel/hydrogen mixer at low pressure upon demand, particularly during start-up and shut-down of the system.

BRIEF DESCRIPTION OF THE DRAWING

The drawing FIGURE is a schematic flow diagram showing a system for operating a solid oxide fuel cell using diesel fuel in accordance with an embodiment of the present invention.

DESCRIPTION OF THE PREFERRED EMBODIMENTS

The drawing FIGURE schematically illustrates a system for operating a solid oxide fuel cell generator using diesel fuel in accordance with an embodiment of the present invention. The diesel fuel supplied to the system comprises refined petroleum distillates, and may contain additives such as anti-oxidants, cetane improvers, corrosion inhibitors, icing inhibitors and stabilizers. In addition, diesel fuel typically includes significant amounts of sulfur. According to Federal Specification VV-F-800D, diesel fuel may have a maximum sulfur content of 0.25 to 0.50 weight percent depending on the particular grade. For example, Grade DF-A diesel fuel has a maximum sulfur content of 0.25 weight percent, while Grade DF-1 diesel fuel has a maximum sulfur content of 0.50 weight percent. Diesel fuel intended for consumption in Southern California must meet the more stringent requirements of the Southern California Air Quality Management District and Air Resource Board, which currently limits sulfur in diesel fuel to 0.05 weight percent maximum.

In accordance with the embodiment of the present invention illustrated in the drawing, diesel fuel comprising substantial amounts of sulfur is delivered to a diesel/hydrogen mixer by a low pressure pump. The diesel/hydrogen mixer, which may comprise any suitable type of container, is preferably maintained at a relatively low pressure during the mixing process. The pressure level in the diesel/hydrogen mixer is preferably less than about 10 atmospheres, and is more preferably maintained substantially at atmospheric pressure.

Hydrogen is supplied to the diesel/hydrogen mixer from a hydrogen separator unit and/or a hydrogen storage unit, as more fully described below. The hydrogen is preferably supplied to the diesel/hydrogen mixer at a relatively low pressure. For example, the hydrogen may be supplied to the diesel/hydrogen mixer at a pressure level of less than about 10 atmospheres, and more preferably at about atmospheric pressure. The diesel/hydrogen mixer may comprise a two-phase mixing device in which the liquid phase diesel fuel is combined with the gaseous phase hydrogen to form a substantially single phase liquid mixture of diesel fuel and hydrogen.

The diesel fuel and hydrogen mixture is then delivered from the mixer to an evaporator by means of a high pressure pump which preferably increases the pressure level of the mixture to about 10 to 20 atmospheres, and more preferably at least about 15 atmospheres. The pressurized mixture is then delivered to a hydrodesulfurizer.

The hydrodesulfurizer preferably consists of a Co—Mo catalyst and a ZnO reactive metal bed for hydrotreating and reacting gaseous $H_2S$. Organic sulfur present in the diesel fuel is converted to $H_2S$ in the presence of the Co—Mo catalyst. The gaseous $H_2S$ subsequently reacts with ZnO to form solid ZnS according to reaction:

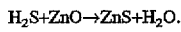

$$H_2S + ZnO \rightarrow ZnS + H_2O.$$

Continued reaction leads to the consumption of ZnO. Once the metal oxide bed is used up, it may be changed periodically. The metal sulfide, e.g., ZnS, may be discarded or used for further chemical processing. Alternatively, the metal sulfide may be regenerated by removing the sulfur and recovering the metal oxide.

The hydrodesulfurizer is used to substantially reduce the sulfur content of the diesel fuel to an acceptable level for introduction into the reformer and the solid oxide fuel cell generator. For example, the sulfur content of the diesel fuel may be reduced to a level of less than about 1 part per million by weight, and preferably to less than about 0.2 part per million.

The desulfurized diesel fuel and the exhaust stream from the SOFC generator is then delivered to a reformer unit preferably operating at high pressure, to reform the organic constituents of the desulfurized diesel fuel into a reformed fuel comprising lower molecular weight hydrocarbons, hydrogen and carbon monoxide. The lower molecular weight hydrocarbons include $C_1$-$C_2$ hydrocarbons, predominantly methane. Standard steam reforming processes take place in the reformer unit for the production and generation of $CH_4$, $H_2$, CO, etc. The steam to carbon ratio is controlled in the reformer to prevent carbon deposition and catalyst breakdown. As shown in the drawing, prior to introduction into the reformer, the desulfurized diesel fuel may be combined with pressurized water vapor from an evaporator to provide additional water in order to prevent carbon formation during the reformation process. A portion of the reformed gas stream may also be recirculated to the reformer to provide additional water vapor to prevent carbon formation.

The reformed fuel is then delivered under pressure to a condenser and then to a hydrogen separator. The hydrogen separator preferably comprises a membrane made of a metallic or polymeric material. A preferred metallic membrane separator comprises substantially poreless Pd—Ag film. The thickness of the Pd—Ag film may be about 1 micron, and may be coated on a nickel sieve structure serving as a porous support material. A particularly suitable Pd—Ag alloy comprises 75 atomic % Pd and 25 atomic % Ag (Pd-25Ag). Hydrogen gas from the reform gas stream dissolves and diffuses through the metallic hydrogen separation membrane. The product gas stream is thus comprised of substantially pure hydrogen.

Suitable polymeric membrane separators include commercial asymmetric or composite membranes. Asymmetric membranes are typically composed of two layers of a single polymer, with dense layer of the polymer performing the separation, and a microporous substrate layer of the polymer providing mechanical support. The polymers used for such asymmetric membranes must have both acceptable permeation characteristics and mechanical properties. Typical composite membranes consist of two different polymers, wherein a separation polymer is coated on a substrate polymer. The use of different types of polymers allows the properties of the separation polymer to be optimized without regard for its mechanical properties. A particularly suitable polymeric membrane comprises semi-permeable polysulphone hollow fibers.

After the hydrogen has been separated from the reformed fuel, it may be delivered directly to the diesel/hydrogen mixer, or it may be stored. The hydrogen typically exits the hydrogen separator at a relatively lower pressure than the reformate gas stream. The hydrogen which is not provided directly to the diesel/hydrogen mixer is directed from the hydrogen separator to a hydrogen storage unit. Prior to storage, the hydrogen may optionally be purified, particularly where the hydrogen is to be stored in the form of a metal hydride, as more fully discussed below.

In the preferred embodiment, the hydrogen from the separator is stored in solid form using reversible metal hydride alloys. While metal hydride storage is preferred in accordance with the present invention, cryogenic storage systems may also be used wherein the hydrogen is liquified. Metal hydride alloys are capable of absorbing large quantities of hydrogen at room temperature, and releasing the hydrogen at relatively low pressure. Suitable metal hydrides include alloys of Ti, Zr, Fe, Mn, Ni, Ca, La, mischmetal, cerium-free mischmetal, Al, Mg, Cu and Li. Particularly suitable metal hydrides include TiFe, Ti(Fe$_{0.9}$Mn$_{0.1}$), Ti(Fe$_{0.8}$Ni$_{0.2}$), Zr(Ni$_{0.95}$M$_{0.05}$), CaNi$_5$, (Ca$_{0.7}$M$_{0.3}$)Ni$_5$, (Ca$_{0.2}$M$_{0.8}$)Ni$_5$, MNi$_5$, LaNi$_5$, (CFM)Ni$_5$, LaNi$_{4.7}$Al$_{0.3}$, MNi$_{4.5}$Al$_{0.5}$, MNi$_{4.15}$Fe$_{0.85}$, LaNi$_{4.25}$Al$_{0.75}$, Mg$_2$Ni and Mg$_2$Cu, wherein M is mischmetal and CFM is cerium-free mischmetal. The alloys are typically provided in granular form and may be sized to −10 mesh or less. Hydrogen is stored in the alloy as a solid metal. The metal hydride system can be recharged with hydrogen numerous times. Metal hydride hydrogen storage systems have been found to be compact and safe during operation unlike other means of gas storage systems such as tank storage.

When metal hydride storage is used in accordance with the present invention, it is preferable to purify the hydrogen stream prior to contact with the metal in order to reduce or eliminate oxygen, carbon dioxide, water, and other constituents which tend to poison the metal hydride. A suitable hydrogen purifier comprises a Pd, Pd—Ag membrane. The hydrogen purifier may significantly prolong the life of the hydrogen storage system.

Hydrogen is selectively released from the hydrogen storage unit to the diesel/hydrogen mixer, preferably at relatively low pressure of less than about 1 to 10 atmospheres, more preferably at about atmospheric pressure. The amount of hydrogen released from the hydrogen storage unit is controlled in order to meet the demands of the diesel/hydrogen mixer. Increased amounts of hydrogen are typically required during start-up and shut-down operations.

After hydrogen has been substantially removed in the hydrogen separator, the high-pressure reformed fuel is delivered to an expander which depressurizes the reformed fuel for delivery to a conventional solid oxide fuel cell generator. In accordance with conventional operation, the solid oxide fuel cell generator exhausts gas to an exhaust combuster, and passes water to a condenser. A portion of the water from the condenser is delivered to the exhaust combuster, while the remaining portion is delivered to a liquid water pump and an evaporator for recirculation to the reformer.

The system of the present invention provides several advantages over prior art systems. The use of a hydrogen membrane separator provides continuous operation with few control components which require maintenance and can lead to process shutdown. The hydrogen membrane separator can effectively produce hydrogen gas of greater than about 98% purity from reformed fuel, and represents a cost effective system for separating hydrogen from the reformed gas stream. The system of the present invention provides the capability of operating a solid oxide fuel cell generator on commercial and military grade diesel fuels without the requirement of an external source of high pressure hydrogen. The use of a metal hydride hydrogen storage system eliminates the need for a reformate and hydrogen recycle compressor, and provides a compact hydrogen storage system. Hydrogen may be stored as a solid metal hydride at relatively low pressure, with more volume efficiency in comparison with compressed gas or liquid hydrogen storage. Hydrogen can be charged and discharged thousands of times, making such storage highly suitable for remote operations.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A system for operating a solid oxide fuel cell generator using diesel fuel comprising:

mixing means for admixing diesel fuel and hydrogen to produce a diesel fuel and hydrogen mixture;

hydrodesulfurizing means for removing sulfur from the diesel fuel and hydrogen mixture to produce a desulfurized diesel fuel mixture;

reforming means for reforming organic constituents of the desulfurized diesel fuel mixture into a reformed fuel comprising lower molecular weight hydrocarbons, hydrogen and carbon monoxide;

hydrogen separator means for separating hydrogen from the reformed fuel;

hydrogen supply means for supplying at least a portion of the hydrogen separated from the reformed fuel to the mixing means;

hydrogen storing means for storing at least a portion of the hydrogen separated from the reformed fuel for subsequent delivery to the mixing means; and fuel supply means for supplying the reformed fuel to a solid oxide fuel cell generator.

2. The system of claim 1, wherein the mixing means includes means for admixing the diesel fuel in the liquid phase with the hydrogen in the gaseous phase.

3. The system of claim 1, wherein the mixing means includes means for admixing the diesel fuel and hydrogen at a pressure of less than about 1 to 10 atmospheres.

4. The system of claim 3, further comprising means for pressurizing the diesel fuel and hydrogen mixture to a pressure of greater than 1 to about 20 atmospheres prior to removing sulfur from the diesel fuel and hydrogen mixture.

5. The system of claim 1, wherein the hydrodesulfurizing means includes means for admixing the diesel fuel and hydrogen mixture with a metal catalyst.

6. The system of claim 5, wherein the metal catalyst comprises CoMo.

7. The system of claim 5, further comprising means for contacting the diesel fuel, hydrogen and catalyst mixture with at least one metal oxide.

8. The system of claim 7, wherein the metal oxide comprises ZnO.

9. The system of claim 1, wherein the hydrodesulfurizing means reduces the sulfur content of the diesel fuel to less than about 1 part per million.

10. The system of claim 1, wherein the hydrogen separator means comprises a membrane separator.

11. The system of claim 10, wherein the membrane separator is polymeric.

12. The system of claim 10, wherein the membrane separator is metallic.

13. The system of claim 10, wherein the metallic membrane separator comprises a substantially poreless Pd—Ag film.

14. The system of claim 1, wherein the hydrogen supply means includes means for supplying the hydrogen to the mixing means at a pressure of less than about 10 atmospheres.

15. The system of claim 1, wherein the hydrogen storing means comprises means for storing the hydrogen at substantially atmospheric pressure.

16. The system of claim 1, wherein the hydrogen storing means comprises means for storing the hydrogen in the form of a metal hydride.

17. The system of claim 16, wherein the metal constituent of the metal hydride comprises at least two metals selected from the group consisting of Ti, Zr, Fe, Mn, Ni, Ca, La, mischmetal, cerium-free mischmetal, Al, Mg, Cu and Li.

18. The system of claim 16, wherein the metal constituent of the metal hydride is selected from the group consisting of TiFe, Ti(Fe$_{0.9}$Mn$_{0.1}$), Ti(Fe$_{0.8}$Ni$_{0.2}$), Zr(Ni$_{0.95}$M$_{0.05}$), CaNi$_5$, (Ca$_{0.7}$M$_{0.3}$)Ni$_5$, (Ca$_{0.02}$Mo$_{0.8}$)Ni$_5$, MNi$_5$, LaNi$_5$, (CFM)Ni$_5$, LaNi$_{4.7}$Al$_{0.3}$, MNi$_{4.5}$Al$_{0.5}$, MNi$_{4.15}$Fe$_{0.85}$, LaNi$_{4.25}$Al$_{0.75}$, Mg$_2$Ni and Mg$_2$Cu, wherein M is mischmetal and CFM is cerium-free mischmetal.

19. The system of claim 16, further comprising purifying means for removing at least a portion of oxygen, carbon monoxide and water from the hydrogen prior to delivering the hydrogen to the hydrogen storing means.

20. A method of operating a solid oxide fuel cell generator on diesel fuel comprising:

admixing diesel fuel and hydrogen in a mixer to produce a diesel fuel and hydrogen mixture;

removing sulfur from the diesel fuel and hydrogen mixture to produce a desulfurized diesel fuel mixture;

reforming organic constituents of the desulfurized diesel fuel mixture into a reformed fuel comprising lower molecular weight hydrocarbons, hydrogen and carbon monoxide;

separating hydrogen from the reformed fuel;

supplying at least a portion of the hydrogen separated from the reformed fuel to the mixer;

storing at least a portion of the hydrogen separated from the reformed fuel in the form of a metal hydride;

selectively supplying hydrogen from the metal hydride to the mixer; and supplying the reformed fuel to a solid oxide fuel cell generator.

21. The method of claim 20, wherein the hydrogen is supplied to the mixer at a pressure of less than about 10 atmospheres.

* * * * *